INVENTOR.
George F. Ritter, Jr.
BY
Nobbe & Swope
ATTORNEYS

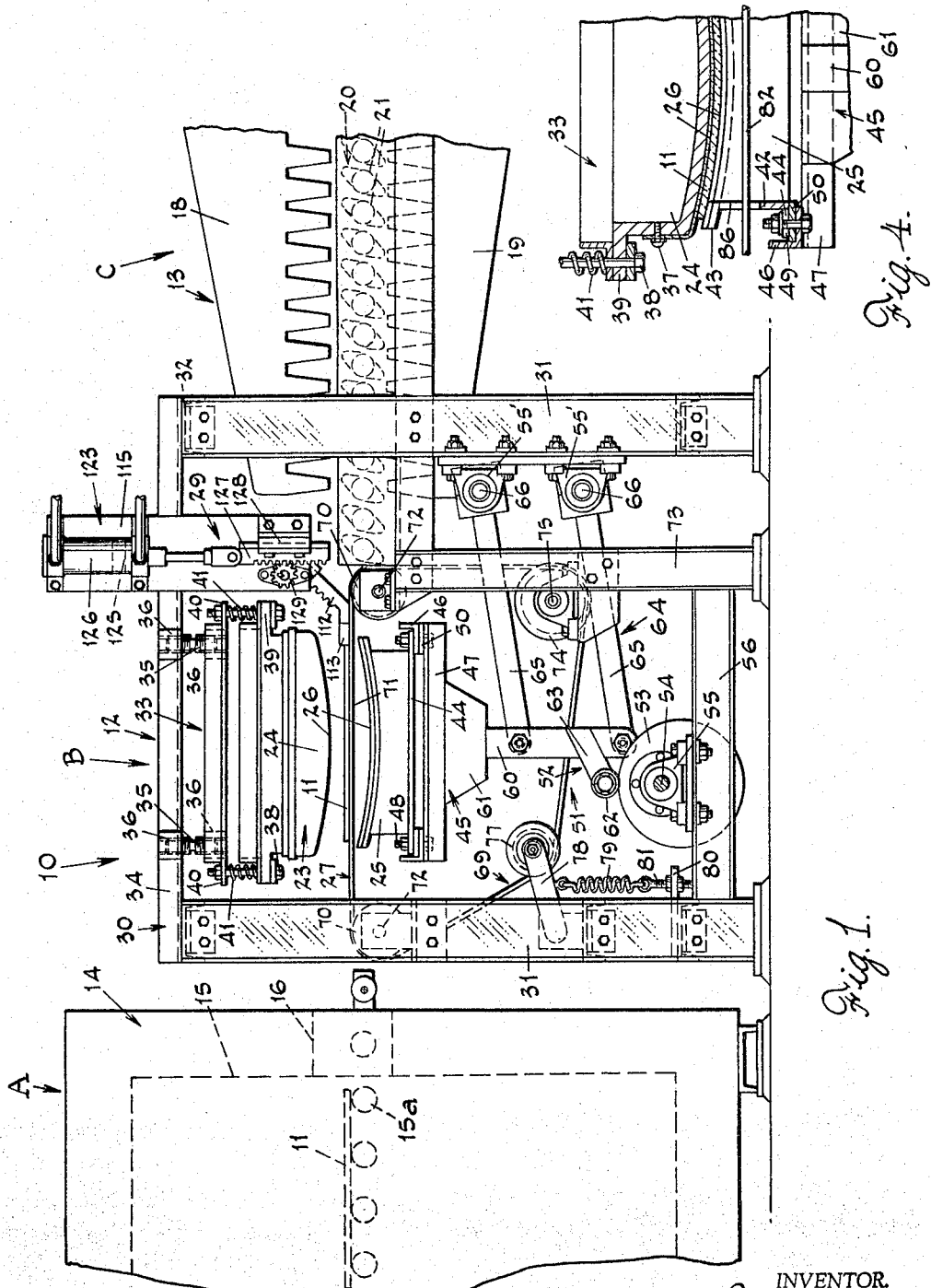

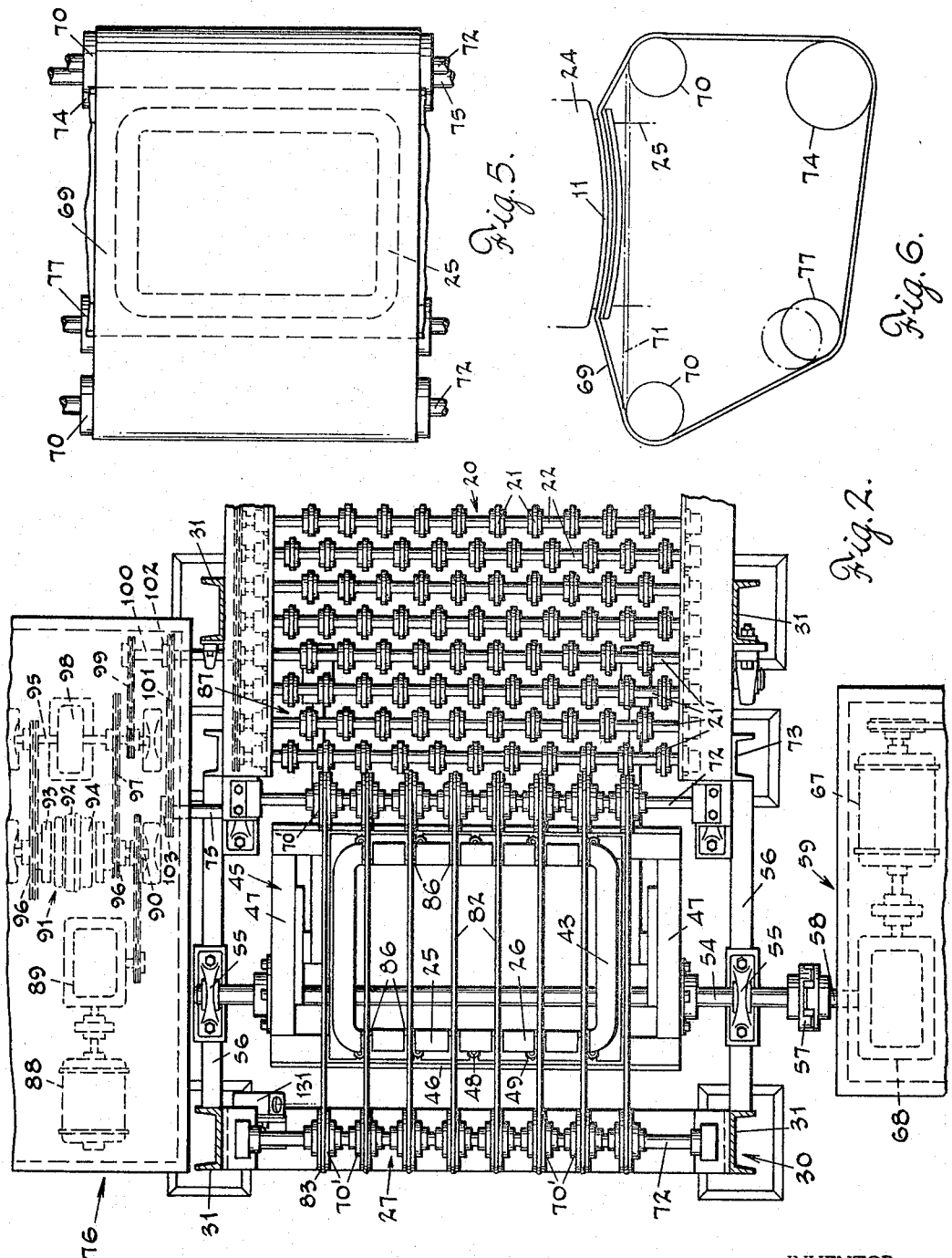

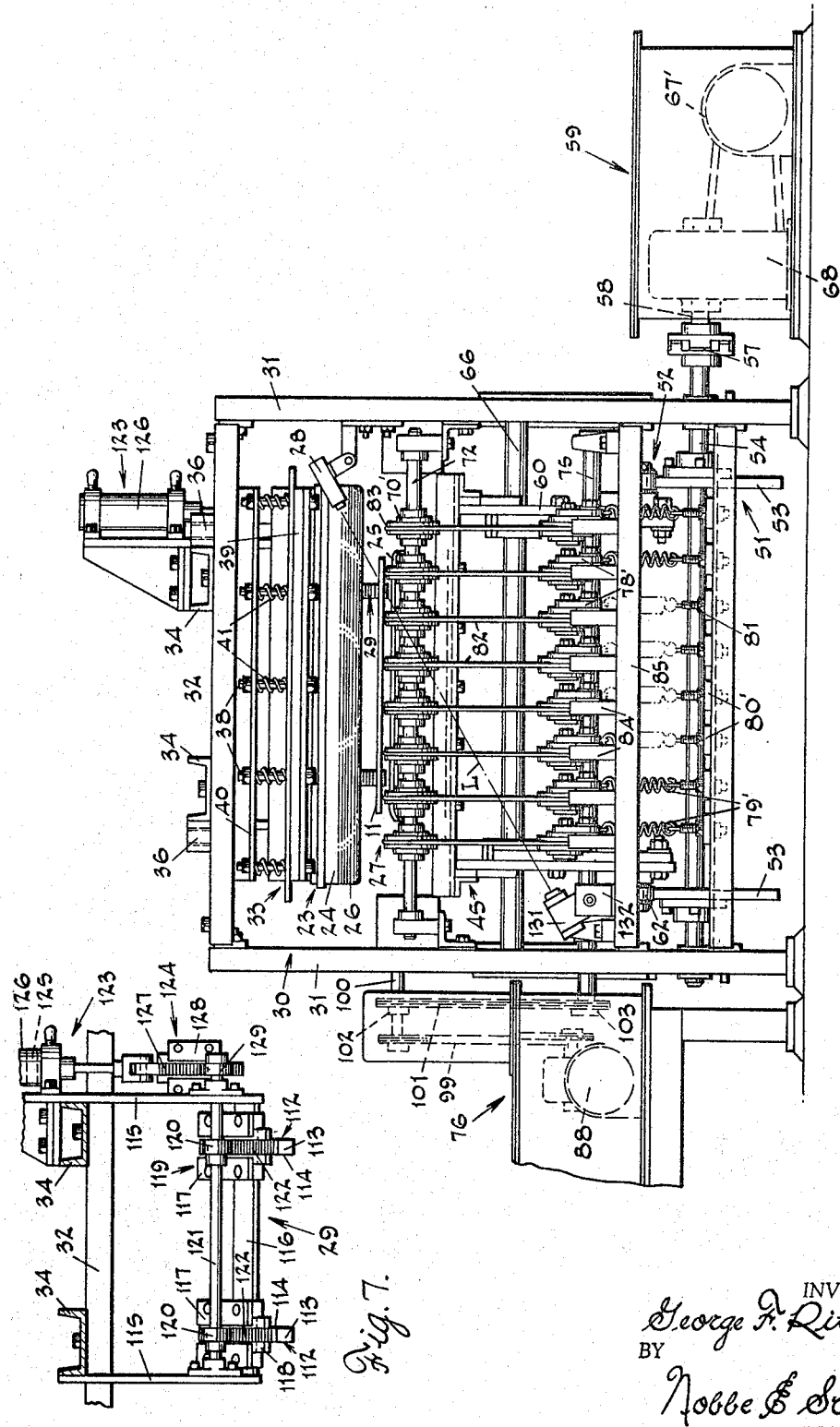

United States Patent Office 3,265,484
Patented August 9, 1966

3,265,484
METHOD AND APPARATUS FOR PRESS BENDING AND TEMPERING GLASS SHEETS
George F. Ritter, Jr., Toledo, Ohio, assignor to Libbey-Owens-Ford Glass Company, Toledo, Ohio, a corporation of Ohio
Filed Dec. 3, 1962, Ser. No. 241,834
13 Claims. (Cl. 65—104)

This invention relates generally to the production of curved, tempered sheets of glass and more particularly to a new and improved method and apparatus for bending and heat treating glass sheets.

Curved sheets of glass are rather widely used as glazing closures, particularly in vehicles such as automobiles or the like. When used in such applications, the curved sheets must meet rather stringent size, strength and optical specifications. Thus the sheets must be bent to precisely defined curvatures dictated by the configuration and size of the opening in which they are to be mounted and, moreover, by the over-all design of the vehicle. In addition, it is necessary for the bent sheets intended for use as glazing closures in vehicles to be tempered to increase their resistance to damage resulting from impact and to modify the breaking characteristics of the glass whereby if the tempered sheets should become broken, they will disintegrate into relatively small, harmless particles as opposed to the large, jagged dangerous pieces resulting when ordinary untempered glass sheets are broken. Finally, the bent and tempered glass sheets must be substantially free of surface defects or optical distortion which would interfere with clear vision through the sheet.

In general, the commercial production of curved, tempered sheets of glass is accomplished by heating substantially flat sheets of glass to an elevated temperature at which the glass softens and may be bent or formed to the desired curvature, followed by chilling the sheets to rapidly reduce this temperature to a point below the annealing range of glass.

The general object of the present invention is to provide a fast yet efficient procedure for producing curved, tempered sheets of glass of the above-described character which meet all the size, strength and optical requirements.

Another object is to accomplish the foregoing by means of a novel bending and tempering apparatus which is relatively simple in construction and operation as compared to former apparatus of this type.

Another object is to provide a bending and tempering apparatus which is fully automatic in operation and which performs the necessary operations on the glass sheets without marring the latter.

The invention also resides in the construction of a novel conveying means for use with the bending and tempering apparatus which operates in timed sequence to the bending and the tempering apparatus and which does not interfere in any way with the operation of the apparatus.

Other objects and advantages of the invention will become more apparent during the course of the following description when taken in connection with the accompanying drawings.

In the drawings, wherein like numerals are employed to designate like parts throughout the same:

FIG. 1 is a side elevational view of one embodiment of a bending and tempering apparatus incorporating the novel features of the present invention;

FIG. 2 is a transverse sectional view showing the apparatus in the modified form of the invention;

FIG. 3 is an end elevational view of the bending apparatus shown in FIG. 2;

FIG. 4 is a fragmentary sectional view of a portion of the mold parts showing the latter in the closed position;

FIGS. 5 and 6 are fragmentary schematic views of the bending conveyor;

FIG. 7 is a fragmentary view of the stop mechanism utilized in the present apparatus;

Figure 8:
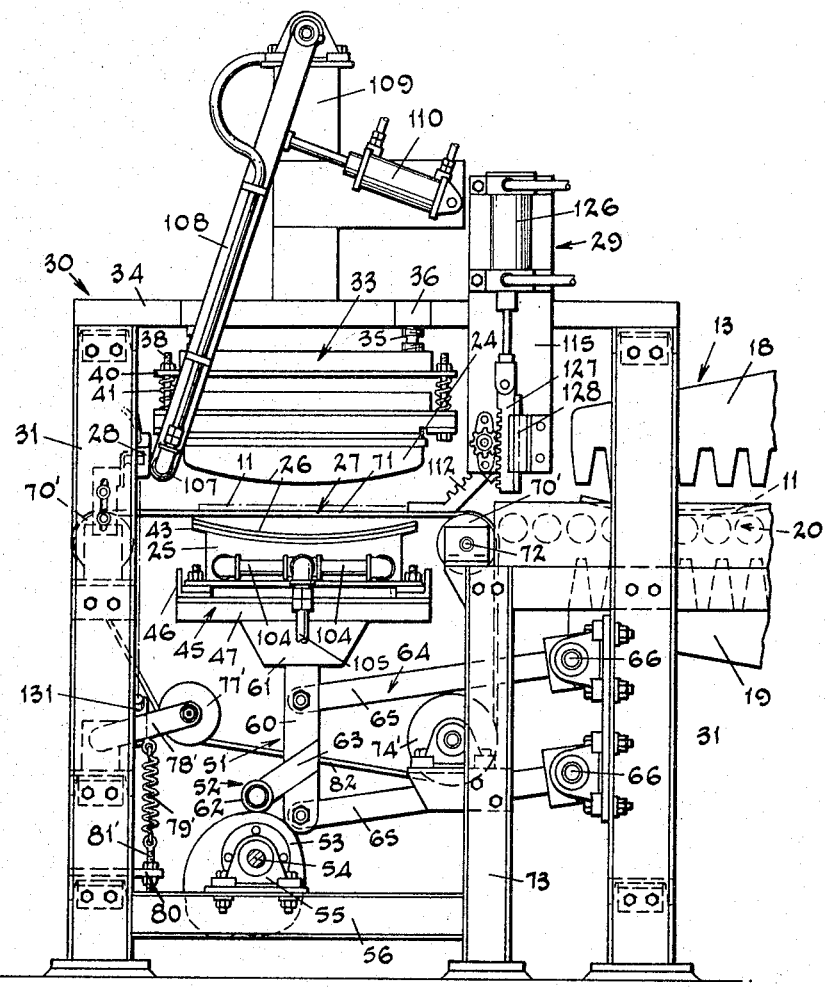
FIG. 8 is a side elevational view similar to FIG. 1 and showing the means for cooling the surfaces of the glass sheet to set the sheet in the desired curvature.

In the production of bent and tempered glass sheets in relatively large quantities, such as would be encountered in the commercial production of glazing closures for automobiles or the like, the sheets are heated, bent and tempered in a substantially continuous procedure. Usually, the sheets of glass are moved successively, one by one, along a path through a heating area, a bending area and finally a chilling or tempering area, which areas are contiguous so that an individual sheet upon being moved through one area passes immediately into and through the following area. The heat imparted to the sheet to bring it to the proper bending temperature is utilized in the tempering process.

For purpose of illustration, the novel features of the present invention are shown in the drawings incorporated in bending and tempering apparatus 10 of a type particularly adapted for use in the production of bent and tempered sheets of glass by a continuous process similar to that described above. Broadly stated, this apparatus includes a conveyor system operable to carry glass sheets 11 along a definite, predetermined path through a heating area A having means (not shown) for heating the glass sheets to the desired temperature, a bending area B having bending means 12 for shaping the sheets to the desired curvature, and a tempering area C having cooling means 13 for rapidly reducing the temperature of the sheets to produce the desired temper in the sheets. To facilitate the detailed description to follow, the position and location of the various elements making up the bending and tempering apparatus will be related to the predetermined path defined by the conveyor system and hereinafter all reference to the path shall be understood to refer to the path of movement of the sheets through the apparatus.

One heating means suitable for use in a continuous bending and tempering process is a tunnel-type furnace 14 having a heating chamber 15 defined by walls constructed of a suitable refractory. The sheets 11 are moved through the chamber 15 on a roll conveyor 15a from an entrance end (not shown) to an oppositely disposed exit end of the furnace where the heated sheets pass through an opening 16 in the furnace wall and into the bending area B. Upon moving into the bending area B, the heated sheets 11 are formed to the desired curvature by the bending means 12. While the glass sheets may be bent by any of a variety of well-known procedures, in the present instance the bending is accomplished by pressing the heated sheets between complemental, interfitting shaping surfaces engageable with the opposite surfaces of the sheet.

When bent to the desired curvature, the sheets are moved along the path out of the bending area B and into the chilling area C where they are exposed to a relatively cool atmosphere to reduce their temperature. As noted above, the process of tempering glass sheets involves chilling sheets heated to an elevated temperature to rapidly reduce their temperature to a point below the annealing range of glass. This process results in the outer surfaces or "skin" of the sheets being cooled at a faster rate than the interior areas of the sheets which, as is commonly known, places the outer surfaces under a compressive stress thereby increasing the impact resistance and improving the breaking characteristics of the glass sheet.

In the present instance, the sheets are cooled by directing streams of a cooling fluid such as air or the like against their opposite surfaces as they are moved along the predetermined path through the tempering area C. For this purpose, the cooling means 13 includes so-called blast heads 18 and 19 spaced along the path from the exit end of the furnace 14 and disposed above and below the path. The sheets are carried along the path between the blast heads by a conveyor 20 extending through the tempering area C. The conveyor 20 comprises rolls 21 fast on shafts 22 extending transversely across the path and being parallelly spaced apart to permit the blasts of air from the lower blast head 19 to pass through the conveyor and impinge on the under surface of the glass sheet carried thereby. Further, to insure free passage of the air through the conveyor 20 and to reduce marring of the sheets, the rolls 21 comprise a series of relatively narrow segments spaced apart along each shaft 22. The segments are encircled with a narrow band of refractory material which band extends radially outwardly from the segments to engage the under surface of the glass sheets.

The aim of the present invention is to provide a novel bending apparatus so constructed as to facilitate the fast and efficient production of curved, tempered sheets of glass by the general process outlined above. To this end, the apparatus is adapted to receive the heated sheets from the furnace, to rapidly but accurately bend the heated sheets to within very close tolerances of the curvature desired and, immediately after the sheets are bent, to transfer the sheets to the cooling area C without delay so that the time elapsing between the sheets emerging from the heated atmosphere and their entry into the cooling atmosphere is of very short duration, thereby insuring that, upon entering the cooling area, the sheets will be at a sufficiently high temperature to produce the desired temper. Moreover, the apparatus is constructed to perform this operation automatically as an incident to the movement of the sheets along the path and to perform the bending and tempering operation with a minimum of marring of the glass sheet.

To these ends, the novel bending and tempering apparatus of the invention includes a shaping mold and a conveyor adapted to move glass sheets, one by one, past the mold. The shaping mold and the conveyor are constructed and operated so as to cooperate with each other in moving the heated sheets from the furnace to the bending area, bending the sheets to the desired curvature, and, thereafter, moving the bent sheets out of the bending area and into the cooling area without the operation of one of the elements interfering, in any way, with the functioning of the other of the elements.

In general, the bending means 12 comprises a shaping mold 23 including male and female mold parts 24 and 25 adapted to press the heated glass sheets into the desired configuration. For this purpose, complemental, interfitting shaping surfaces 26 conforming in curvature to the sheets when bent are formed on the opposed faces of the mold parts 24 and 25 which are movable relative to each other and to the path to bring the shaping surfaces into pressing engagement with the opposite sides of the heated sheets.

The heated sheets are moved along the predetermined path from the exit end of the furnace 14 to the entrance end of the blast heads 18 and 19 and between the mold parts 24 and 25 on a conveyor 27 disposed in end-to-end alignment with both the conveyor 15a in the furnace and the conveyor 20 in the blast heads. In response to a signal emanating from a device 28 sensing the movement of a sheet along the path, a bending sequence is initiated in which the sheet is stopped momentarily between the mold parts 24 and 25, positioned relative to the shaping surfaces 26 by a locating device 29, pressed between the shaping surfaces 26 of the mold 23, and then carried along the path and between the blast heads 18 and 19.

The bending means 12 is carried by a suitable supporting framework 30 which includes two substantially vertically disposed columns 31 disposed at each side of the path and spaced apart longitudinally along the path with the columns on opposite sides of the path being transversely aligned. The columns 31 extend upwardly above the conveyor 27 and are tied together at their upper ends by horizontally disposed beams 32 extending transversely across the path and secured at their opposite ends to the aligned columns to form a rigid box-like structure.

As mentioned above, the glass sheets are shaped by being pressed between the complemental shaping surfaces 26 formed on the male and female mold parts 24 and 25. To this end, the mold parts are mounted to move relative to each other between an open position, wherein the mold parts are spaced apart with one of the parts 24 above the conveyor 27 and the other part 25 below the conveyor, to a closed position wherein the shaping surfaces 26 on the mold parts are in close proximity and operable to press a glass sheet therebetween. While either or both mold parts 24 or 25 may be moved in the bending operation, in the present instance the upper mold part 24 remains substantially stationary and the lower mold part 25 reciprocates back and forth in a vertical plane toward and away from the upper mold part. In this manner, as a heated sheet is carried by the conveyor 27 into the bending area B and between the mold parts 24 and 25, it is raised by the lower mold part into pressing engagement with the upper mold part to form the sheet to the desired shape after which it is returned to the path and mode into the tempering area C.

As best shown in FIG. 3, the upper mold part 24 is supported above the plane of the conveyor 27 on a mounting frame 33 carried by beams 34 extending longitudinally along the path and fixed at their opposite ends to the beams 32. In order to permit alignment of the mounting frame 33 with the conveyor 27, the frame is attached to the beams 34 by adjustable means such as rods 35 having their opposite ends threaded into tapped blocks 36 secured to the beams and to the frame.

Within the spirit of the invention, the mold part 24 may be of any construction and may be formed from any one of a variety of materials capable of withstanding the rather high temperatures to which the mold is subjected. In the exemplary embodiment, the mold part 24 comprises a cup-shaped structure cast from a suitable material such as metal or plaster and having a male or generally convex shaping surface 26 formed on the outer or downwardly directed surface thereof. In order to avoid marring the glass sheets and to better enable the upper mold part 24 to withstand the high temperatures to which it is subjected, the shaping surface 26 may be covered with a heat resistant, nonabrasive material such as asbestos or glass cloth held in place by a band 37 encircling the mold part. In the present instance, the upper mold part 24 and the mounting frame 33 are illustrated as being substantially rectangular in outline, such as would be utilized in bending automobile side lights, with the long sides of the rectangle extending transversely across the path of movement of the sheets through the bending area B. It will be appreciated, however, that the particular outline of the mold is dictated by the shape of the glass sheets to be bent.

The upper mold part 24 is supported on the mounting frame 33 by means of bolts 38 passing through a flange 39 formed integrally with and projecting laterally outwardly from the upper mold part and through an opposed flange 40 on the mounting frame. The mold part 24 is held in spaced relation to the mounting frame 33 by resilient means such as coil springs 41 telescoped on the bolts 38 and acting between the opposed surfaces of the flange 39 on the mold and the flange 40 on the mounting frame. The coil springs 41 serve to permit yielding of the upper mold part 24 to prevent excessive pressure being exerted on the glass sheets as the lower mold part 25 is moved into pressing engagement therewith. In addition, by tightening or loosening the nuts on the bolts 38, thereby compressing or relieving the springs 41, the plane of the mold part 24 may be adjusted relative to the plane of the conveyor 27.

In the illustrated embodiment, the lower mold part 25 is an open ring-type structure having shaping surfaces 26 which conform in outline and curvature to the shaping surface on the upper mold part 24 and which are adapted to engage only the marginal edge portions of the sheets thereby to avoid marring the viewing area of the sheet. Here again, it will be appreciated that the particular configuration of the mold part 25 is dictated by the outline shape of the glass sheet to be bent. In the present instance, the lower mold part 25 comprises vertically disposed walls 42 arranged in an open rectangular box-like configuration and having flanges 43 and 44 projecting laterally outwardly therefrom at their upper and lower ends. The shaping surfaces 26 are formed on or carried by the uppermost flange 43.

The lower mold part 25 is mounted to move relative to the path along which the sheets are carried between a lowered position wherein the shaping surfaces are disposed below the plane of the path and a raised position wherein the shaping surfaces are disposed above the plane of the path and in close proximity to the shaping surfaces formed on the upper mold part 24. To this end, the lower mold part 25 is mounted on a carriage 45 comprising angle iron side members 46 and end members 47 arranged in a rectangular configuration slightly larger than the mold part 25. The side members 46 of the carriage extend transversely of the path with one leg disposed in a substantially horizontal plane and the other leg projecting upwardly at opposite sides of the mold part. The end members 47 of the carriage 45 also have one leg disposed in a horizontal plane so that together with the horizontally disposed legs of the side members they form a continuous supporting surface for the lowermost flanges 44 on the mold part. The flanges 44 rest between the upstanding legs of the side members 46 and are secured to the carriage by bolts 48 extending through holes bored in the horizontally disposed legs of the side members and through elongated slots 49 provided in the corresponding edges of the flanges 44 on the lower mold part. The slots 49 permit the lower mold part 25 to be shifted in a transverse plane relative to the carriage 45 to properly align the upper and lower mold parts. Disposed between the carriage 45 and the flanges 44 on the lower mold part are shim bars 50 which may be varied in thickness to properly position the mold part relative to the plane of the path.

Raising and lowering of the lower mold part 25 toward and away from the upper mold part 24 is accomplished through the medium of a suitable actuating mechanism 51 coupled to the carriage 45 supporting the mold part. While many different actuating mechanisms could be employed to impart the desired reciprocal motion to the lower mold part, in the illustrated embodiment a simple cam and follower mechanism is utilized. More specifically, a cam follower 52 operatively coupled to the carriage 45 rides on the outer periphery of a disk cam 53 shaped in the usual manner to impart the desired sequence of motion to the follower and thus to the carriage.

Herein, two actuating mechanisms 51 are provided, one on each side of the path but, since the mechanisms are identical in construction, a detailed description of one will suffice for the present purposes. The disk cam 53 is fast on a shaft 54 underlying the lower mold part 25 and extending transversely of the path beneath the conveyor 27. The shaft 54 is journaled adjacent its opposite ends in bearings 55 mounted on structural members 56 disposed at opposite sides and extending longitudinally of the path with their opposite ends carried by the vertical columns 31. One end of the shaft 54 projects outwardly beyond the framework 30 and is connected, through the medium of a coupling 57, to the output shaft 58 of a power source 59 operable to rotate the shaft about a fixed horizontal axis.

As noted above, similar actuating mechanisms 51 are provided at opposite sides of the mold and, therefore, it will be appreciated that an identical cam is similarly mounted on the shaft beneath the oposite side of the lower mold part 25 (FIG. 3).

As the cam 53 is rotated by the shaft 54, the follower 52 rides along the developed irregular outline of the outer periphery of the cam and thereby is reciprocated along a substantially vertical axis toward and away from the axis of the shaft. The follower 52 is coupled to the carriage 45 so as to transmit the reciprocal motion, imparted to the follower by the cam 53, to the lower mold part 25. For this purpose, the follower 52 is mounted on a bar 60 depending from the carriage 45 toward the shaft 54 with the upper end of the bar 60 being secured to the carriage. In the present instance the bar 60 is fixed at its upper end to a plate 61 secured to the carriage 45 and extending downwardly therefrom. The follower 52 comprises a roller 62 journaled on one end of an arm 63 secured at its opposite end to the bar 60 intermediate the ends thereof and inclined downwardly toward the cam 53 whereby the roller 62 rests on the edge of the cam and thus supports the lower mold part 25.

In order to guide the endwise movements of the bar 60 and to support it at all times in a substantially vertical position, the bar is coupled to the framework 30 of the bending means by links which, together with the frame and the bar, comprise a four bar linkage 64 with the links arranged in a parallelogram. As shown in FIG. 1, the bar 60 and one of the vertical columns 31 form one pair of parallel links in the linkage 64. The other pair of parallel links comprise two elongated members 65 extending between the bar 60 and the framework 30 and each having one of their ends journaled to the bar 60 at spaced points therealong and their opposite ends fast on parallel shafts 66 extending between the transversely aligned columns 31 with their opposite ends journaled in bearings 55' mounted on the columns to turn about parallel, fixed, substantially horizontal axes. Since with this type of linkage the links of each pair remain parallel to each other at all times, the bar 60 remains parallel to the vertical columns 31 throughout its endwise movements.

It will be apparent that the bar 60 does not move in a straight line but rather follows a slightly arcuate path as it is raised and lowered by the actuating mechanism 51. Initial adjustment, however, may insure that, in the uppermost position of the lower mold part 25, the shaping surfaces 26 on the mold parts 24 and 25 are in proper registry.

From the foregoing, it will be appreciated that the lower mold part 25 is moved intermittently and is raised only when a heated sheet 11 is moved between the mold parts 24 and 25 by the conveyor 27. When the sheet is properly positioned relative to the mold parts 24 and 25 by the locating device 29, which will be more fully disclosed hereinafter, movement of the lower mold part 25 through one raising and lowering cycle is effected by rotation of the shaft 54 through one revolution. To this end, the power source 59 coupled to one end of the shaft 54 includes a combined magnetic clutch and brake unit 67, commonly identified as a cycle dyne unit, which controls the rotation of the shaft 54 in response to signals emanating from a suitable device 28 sensing the presence of a sheet in the bending area B. The cycle dyne unit 67 is driven by a motor 67' and is coupled to the shaft 54 through a speed reduction unit 68. The output shaft of the unit 67 is normally prevented from rotating by the brake of the unit 67 but in response to a signal from the sensing device 28, which may be a photoelectric cell or the like, the brake is released and the clutch engaged to couple the output shaft through the speed reducing unit to the shaft 54. After the shaft 54 has been rotated the desired amount, in the present instance through one revolution, which results in the lower mold being moved through one up and down cycle of movement, the clutch is released and the brake once more energized to stop and hold the output shaft of the unit 67.

The function of the conveyor 27 is to carry the heated sheets from the furnace 14 to a position between the upper and lower mold parts 24 and 25 and, after the sheets are bent, to carry them away from the bending area B and into the chilling or tempering area C. As mentioned above, the glass sheets begin losing heat and decreasing in temperature as soon as they leave the heated atmosphere of the furnace 14 and begin their movement through the bending area B. In order to insure that the temperature of the glass sheets will not decrease below that necessary for proper bending and tempering of the sheets, the conveyor 27 and the bending means 12 are designed to move and bend the sheets quickly and efficiently and to deliver them into the chilling area C at a sufficiently high temperature to insure adequate tempering. It will also be apparent that since the sheets are heated and in a softened condition, the conveyor 27 associated with the bending means 12 must provide adequate support for the heated glass sheets and at the same time must not interfere in any way with the operation of the bending means. In addition, the conveyor must provide the necessary support for the sheets without marring their heat softened sheets since any mars or defects in these surfaces would render the sheets unacceptable from an optical standpoint.

To move the sheets in the desired manner without encountering the aforementioned difficulties, in accordance with the present invention, the conveyor 27 is constructed in a novel manner so as to provide the necessary support for the sheets without damaging the surfaces of the sheets and without interfering in any way with the functional operation of the mold parts 24 and 25. To these ends, the conveyor 27 comprises a flexible endless member 69 such as a belt or the like disposed in a closed loop having a substantially horizontal run extending along the path and supported by guide means provided at opposite sides of the mold parts. The belt is driven endwise to advance the sheets through the bending area B from the heating area A to the chilling area C. The flexible member provides adequate support for the glass sheets during their movement through the bending area B without hindering the bending operation performed by the mold parts.

Herein, the loop formed by the belt 69 is defined by pulleys disposed around the lower mold part and including two guide pulleys 70 aligned with the path with one pulley located at each side of the lower mold part to support a horizontal run 71 of the belt extending along the path and between the upper and lower mold parts (FIG. 1). The pulleys 70 are secured to shafts 72, one being journaled on the upright columns 31 at one side of the mold part 25 adjacent the exit opening 16 in the furnace and the other being journaled on pedestals 73 disposed at the opposite side of the lower mold part 25 and between the longitudinally spaced columns 31. The shafts 72 are rotatable about parallel axes lying in a common plane so that the outer peripheries of the pulleys are tangent to the plane of the path. The horizontal run 71 of the belt 69 is aligned with and disposed between the furnace conveyor and the conveyor 20 so that as the belt is driven endwise around the loop the heated glass sheets are advanced from the exit opening 16 of the furnace 14 into the bending area B and between the mold parts.

The belt 69 is driven endwise around the loop by a drive pulley 74 fixed to a shaft 75 disposed below the path and having its opposite ends journaled on the pedestals 73 to rotate about a fixed, horizontal axis extending transversely of the path. The shaft 75 is rotated by a power source 76 to be hereinafter more fully described.

The tension of the belt 69 is controlled by an idler pulley 77 adapted to selectively increase or decrease the length of the path followed by the belt. For this purpose, the idler pulley is journaled on one end of arms 78 pivoted at their opposite end to the columns 31 disposed adjacent the exit end of the furnace to move toward and away from the center of the loop.

As best shown in FIGS. 5 and 6, the belt 69 may be of such a width as to completely overlie the lower mold part 25. The belt conveys the heated sheets along the path to a position between the mold parts and during the bending operation is deflected upwardly by the lower mold part and pressed between the shaping surface of the lower mold part and the surface of the glass sheet. To this end, the belt 69 is normally maintained in a somewhat taut condition, so that the horizontal run 71 lies in the plane of the path of movement of the sheets as shown in phantom in FIG. 6, by the idler pulley 77 which exerts an outwardly directed force against the belt. The pulley 77 is mounted through the medium of the arms 78 to be resiliently yield upwardly as the belt 69 is deflected out of the plane of the path by the lower mold part 25 as shown in full line in FIG. 6.

To apply the desired tensioning force against the belt 69 while permitting the belt to be deflected out from its normal loop, yieldable means 79 acting between the arms 78 supporting the idler pulley 77 and the framework are provided to resiliently urge the pulley outwardly against the inner surface of the belt. In the present instance, the yieldable means 79 comprise tension springs having one end fixed to the arms 78 intermediate their ends and the opposite end secured to a lug 80 fast to the framework of the bending means. The magnitude of the outwardly directed force exerted by the idler pulley 77 may be adjusted through the medium of a threaded connection 81 between the lower end of the springs and the lug on the framework 30.

The belt 69 may be made from any material which is sufficiently flexible to enable the belt to conform to the shaping surfaces 26 of the mold parts and which is able to withstand the relatively high temperatures to which the sheets are heated. The material, however, is such that the belt does not mar the surfaces of the glass sheets. As will be appreciated, suitable materials would be asbestos cloth, glass cloth or the like. Further in this regard, it will be appreciated that the belt is driven by the power source 76 in timed sequence to the operation of the bending means 12 so as to avoid relative movement between the belt and the glass sheets during the bending operation. Thus the belt 69 carries the heated sheets between the mold parts, stops while the bending cycle is being performed and, thereafter, resumes its endwise movement to carry the sheets away from the bending means.

A modification of the invention is depicted in FIGS. 2 and 3 wherein instead of a wide, blanket-type belt completely covering the lower mold part, a plurality of relatively narrow, flexible members 82 such as belts or wires or the like are utilized. In this embodiment, the operation of the conveyor remains essentially the same as that described above except that the lower mold part 25 and the conveyor are constructed to cooperate with each other permitting the lower mold part to lift the heated glass sheets off the conveyor during the bending cycle. Thus with the modified embodiment, the movements of the conveyor need not be in timed sequence to the bending cycle.

The pulley arrangement defining the closed loop of the endless conveyor in the modified form of the invention is also substantially the same as that described above except that the belts 82 are arranged in a plurality of individual identical loops parallelly spaced apart transversely across the path. Each belt is guided by individual guide pulleys 70', drive pulleys 74' and idler pulleys 77' each provided with an outwardly opening groove 83 in its periphery to receive one of the belts. The guide pulleys 70', defining the horizontal run of the conveyor, are disposed side by side on the shafts 72 journaled at opposite sides of the lower mold part 25 and are longitudinally aligned. The individual drive pulleys 74' are fast to the driven shaft 75 of the conveyor and aligned with the guide pulleys 70'.

The idler pulleys 77' associated with each of the individual belts are journaled on one end of a plurality of arms 78' pivoted at their opposite ends to blocks 84 fixed to a structural member 85 extending transversely of the path with its opposite ends secured to transversely spaced upright columns 31 of the framework 30. Each of the arms 78' are resiliently urged downwardly to hold the idler pulleys against the individual belts. To this end, yieldable means such as coiled tension springs 79' acting between the arms and lugs 80' on the framework 30 are provided to permit each arm to pivot relative to the uprights independent of the pivotal movement of the other arms. In this manner, each belt 82 is permitted to deflect from its normal path independently of the other belts. Here again, the magnitude of the outwardly directed force exerted by each idler pulley 77' may be adjusted through the medium of a threaded connection 81 between the lower end of the springs 79' and the lugs 80 on the framework 30.

After the heated sheets are moved into proper position between the mold parts by the conveyor, according to one aspect of the modified form of the invention, the sheets are lifted from the conveyor by the lower mold part and are carried thereby into pressing engagement with the upper mold part thus insuring that the conveyor does not interfere in any way with the bending operation. Moreover, by lifting the glass sheets off of the conveyor during the bending procedure the drive apparatus for the conveyor may be simplified in that the movement of the conveyor need not be timed in sequence with the movements of the lower mold part. To this end, the lower mold part 25 is provided with a series of aligned slots 86 in its upper surface, which slots are adapted to receive the individual belts as the lower mold part moves upwardly relative to the plane of the conveyor.

In operation, the conveyor 27 receives the heated sheets from the furnace 14 and moves them at a constant speed into position between the mold parts 24 and 25. After the sheets are bent, in order to insure that their temperature will not decrease below that necessary for proper tempering, the sheets are carried from the bending area B by the conveyor at a rapid rate of speed as compared to the rate of speed at which the sheets move through the furnace. Adjacent the entrance end of the blast heads 18 and 19 movement of the sheets is decelerated to a speed comparable to that of their movement through the furnace, which speed is such as to promote a proper rate of cooling to thereby produce the proper temper in the sheets.

To accomplish the foregoing, the conveyor 27 and a section 87 of the conveyor 20 are driven at variable speeds to move the sheets in the manner described. The section 87 is disposed at the leading end of the conveyor 20 to receive the sheets from the conveyor 27 and advance them into the tempering area C. As best shown in FIG. 2, the section 87 comprises the rolls 21' of the conveyor 20 adjacent the bending area B, four such rolls being thus employed in the illustrated form of the invention. These rolls 21' are constructed and mounted the same as the rolls 21 forming the remainder of the conveyor 20 but are driven, along with the conveyor 27, by the multiple speed power source 76.

The power source 76 includes a motor 88 coupled, through a suitable gear reduction unit 89, to an input shaft 90 of a magnetic clutch 91, which shaft is journaled to rotate about a fixed axis. A driving member 92 of the clutch 91 is fast on the shaft 90 intermediate its ends to rotate therewith and is selectively engageable with either of two driven members 93 and 94 of the clutch, which members are disposed at opposite sides of the driving member and mounted on the shaft to rotate relative thereto. The driven members 93 and 94 are coupled to a shaft 95 journaled to rotate about an axis parallel to the axis of the shaft 90 through the medium of suitable drive means such as pulleys 96 fixed to the driven members 93 and 94 and the shaft 95 and belts 97 entrained around the pulleys. As is well known, by selecting the size of the pulleys utilized, the shaft 95 may be rotated at either of two speeds depending upon which driven member 93 or 94 is engaged with the driving member 92 of the clutch. When the clutch 91 is entirely disengaged, rotation of the shaft 95 is suspended and no power is transmitted to the conveyor 27 or the section 87 from the power source 76. To stop the shaft 95 quickly and to prevent it from turning when the clutch is not engaged, a magnetic brake 98 is associated with the shaft and suitably controlled so as to be activated when the clutch is disengaged.

The shaft 95 is coupled by a suitable belt and pulley drive means 99 to an output shaft 100 of the power source 76 which shaft is rotatable about a fixed axis extending parallel to shaft 95 and projects outwardly from the power source toward the conveyor 27. The power source 76 is coupled to the drive shaft 75 of the conveyor 27 through the medium of an endless belt or chain 101 entrained around a pulley 102 fast to the output shaft 100 and a pulley 103 fixed to the end of the drive shaft 75.

In the present instance the output shaft 100 of the power source 76 extends across the path and supports one of the rolls 21' of the section 87 of the conveyor 20. The output shaft 100 is coupled to and drives the remaining rolls 21' of the section 87 at rates of speeds determined in the manner outlined above by the magnetic clutch 91 and the brake 98.

The conveyor 27 and the section 87 are normally driven at a constant speed which is the same as the speed at which the glass sheets are moved through the furnace. If the wide belt 69, shown in FIG. 5, is utilized, when the glass sheets are moved into position between the bending molds, the forward movement of the sheet is halted and the sheet is properly positioned by a locating device preparatory to the actual pressing operation.

More specifically, upon moving into the bending area, the presence of a glass sheet is detected by the sensing device 28 which produces a signal operable through suitable circuitry to energize the brake 98 and thereby interrupt the rotation of the drive pulley 74 of the conveyor 27 and the rotation of the rolls 21' of the section 87. The signal produced by the sensing device also initiates the bending cycle. After the bending sequence is completed the brake 98 is released and the clutch 91 engaged to rotate the drive shaft 75 and the rolls 21' of the section 87 at an accelerated rate of speed whereby the sheets are rapidly advanced into the chilling section C.

When the conveyor comprising a number of relatively narrow belts 82 is utilized together with the slotted lower mold part, the movements of the conveyor 27 need not be interrupted during the bending cycle. Thus, with the modified form of the invention, the glass sheets are moved into position between the mold parts, properly located relative to the mold parts by the device 29 and then are lifted off of the conveyor 27 and carried into pressing engagement with the upper mold part.

While the glass sheets are resting on the lower mold part, the magnetic clutch 91 is disengaged from one driven element and engaged with the other driven element to accelerate the speed of the conveyor so that upon being returned to the conveyor the sheets are rapidly moved into the chilling area. Upon being introduced between the blast heads, the clutch is disengaged from one driven member and engaged with the other driven member to decelerate the forward movement of the sheets whereupon the conveyor is in condition to receive an additional heated sheet from the furnace.

Since the heated glass sheets remain at a relatively high temperature after they are bent and while they are being delivered to the chilling area C by the conveyor, there is a tendency for the sheets to sag toward the conveyor and to lose their curvature. To counteract this tendency, according to another aspect of the present invention, the sheets are cooled slightly while still supported on the curved shaping surface 26 of the lower mold part 25 to reduce their temperature to a point where the glass takes a set rendering the sheets more rigid. To this end, the bending cycle is controlled so that after the sheets are bent by being pressed against the upper mold part, and while they are carried by the shaping surfaces 26 of the lower mold part, the opposite surfaces of the sheets are subjected to blasts of cooling fluid, preferably air, before they are returned to the horizontal run 71 of the conveyor 27. This process is particularly adapted for use with the modified form of the conveyor and is so illustrated since with this construction the air may flow freely between the belts 82 and against the lower surface of the sheet resting on the mold.

Figure 9:
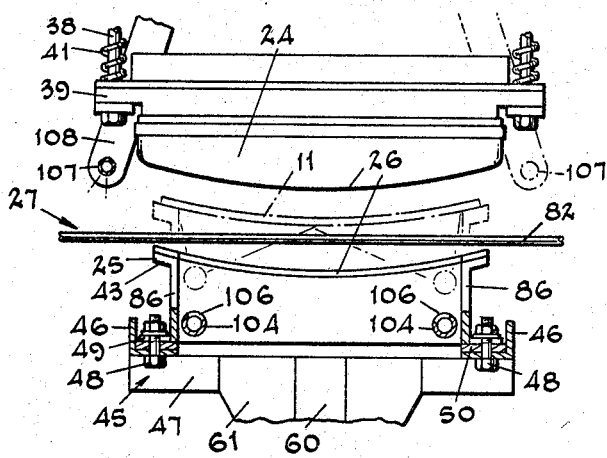
FIG. 9 is a fragmentary view of the apparatus shown in FIG. 8.

As shown in FIGS. 8 and 9, the lower surface of a sheet resting on the lower mold part 25 is cooled by streams of air flowing from pipes 104 carried by the lower mold part 25 below the shaping surfaces 26. In the present instance, two such pipes 104 are utilized, which pipes extend through a wall 42 of the lower mold part with their outer ends coupled to a source of pressurized air (not shown) by a conduit 105. The pipes 104 extend transversely across the path and are provided with apertures 106, such as elongated slots in their upper surfaces through which the air flows against the under surface of the sheet.

Cooling of the upper surface of the sheet is effected by directing air from a pipe 107 normally disposed in an out-of-the-way position to the side of the upper mold part 24 and mounted to be passed over the glass sheet and between the upper and lower mold parts.

To this end, the pipe 107 extends transversely across the path and is carried at one end of an arm 108 pivoted at its opposite end to a post 109 upstanding from the framework 30 above the upper mold part 24. Swinging of the arm 108 about its pivoted end as an axis moves the pipe 107 longitudinally of the path from one side of the upper mold part to the other, whereby during such movement the pipe traverses the upper surface of the glass sheet supported on the lower mold part. The arm 108 is swung back and forth in timed sequence with the movements of the lower mold part by a reversible actuator 110 such as a piston and cylinder acting between the arm and the post 109. By selectively admitting pressure fluid into either the head end or the rod end of the cylinder, the piston is slid relative thereto and thus swings the arm about its one end as an axis which passes the pipe 107 over the glass sheets. The pipe 107 is coupled to a source of pressurized air (not shown) by a flexible conduit and is provided with a downwardly opened aperture through which the air flows against the upper surface of the glass sheet as the pipe passes thereover.

In order to provide sufficient time for the sheets to be slightly cooled in the above-described manner before being returned to the horizontal run 71 of the conveyor 27, after the sheets are bent, the downward travel of the lower mold part 25 is momentarily interrupted while the opposite surfaces of the sheet are exposed to the streams of cooling air. This movement of the lower mold part 25 may be effected in a number of ways; for example, the rotation of the cam shaft 54 of the actuating mechanism 51 could be momentarily halted. In the present instance, however, for purpose of simplicity, the generated surface of the cam 53 is shaped, in a well-known manner, to provide a dwell period during which there is no movement of the lower mold part relative to the conveyor. During this interruption in the movements of the lower mold part, pressurized air is introduced into the pipes and the arm carrying the upper pipe is swung from one side of the upper mold part to the opposite side as shown in phantom in FIG. 9.

As described above, when a heated sheet is carried from the heating area A into the bending area B, its leading edge contacts the locating device 29 which properly positions the sheet relative to the shaping surfaces 26 on the mold parts 24 and 25. In the present instance, as best shown in FIGS. 1 and 7, the locating device 29 includes transversely spaced retractable stop members 112 carried by the framework 30 to move toward and away from the path of movement of the sheets. The stop members 112 include abutment surfaces 113 formed on arms 114 slidably supported on the framework 30 above the conveyor 27 for linear movement between a raised and a lowered position. In the lowered position, the surfaces 113 are disposed in the plane of the path in order to engage the leading edge of a sheet being carried along the path thereby to correctly position this sheet relative to the mold parts. It will be appreciated that either the operation of the conveyor 27 is controlled so that its movement is halted at the same time as the sheet engages the stops 112 or the bending cycle is timed so that the lower mold part lifts the sheet off the conveyor at the same time as the sheet engages the stops. In either event, relative movement between the conveyor and the sheet is avoided. When the upward movement of the lower mold part 25 is initiated, the stops 112 are retracted to an out-of-the-way position above the path and remain in this position until the bending sequence is completed and the bent sheet carried out of the bending area B.

Herein, the device 29 is caried by a pair of plates 115 depending from the beams 34 at opposite sides of the path with their upper ends fixed to the beams and their lower ends joined together by a horizontally disposed bridging member 116 extending across the path. The bridging member 116 is provided with guide-ways 117 for slidably supporting gib portions 118 integral with the arms 114.

Sliding of the arms 114 back and forth in the guide-ways 117 is accomplished by an actuating mechanism 119 operable to impart linear axial movement to the arms. Herein, the actuating mechanism 119 comprises a simple pinion and rack arrangement including pinion gears 120 fast on a shaft 121 spanning the plates and rotatable about a fixed axis. The pinions 120 mesh with rack segments 122 formed on the arm 114 whereby rotation of the shaft 121 in opposite directions slides the arms 114 toward or away from the path, sliding of the arms in either direction being guided by the gib portions 118 and the coacting guide-ways 117.

Rotation of the shaft 121 may be effected by a reversible power actuator 123 operable to selectively rotate the shaft in opposite directions. In the embodiment illustrated, the actuator 123 comprises a reciprocating mechanism 124 such as a piston and cylinder together with a gear arrangement coupling the mechanism 124 to the shaft 121 and operable to rotate the latter. Accordingly, the mechanism 124 comprises a double acting piston 125 sliding in a cylinder 126 mounted on the plate 115 adjacent one end of the shaft 121. The driven member or piston rod carries a toothed rack 127 slidable endwise in guide-ways 128 mounted on the plate 115 along a path extending normal to the shaft 121. Meshing with the rack 127 is a pinion 129 fast on an extension of the shaft 121 projecting through the plate 115. Pressure fluid may be admitted selectively to either the rod or head end of the cylinder 126 to slide the piston 125 along the cylinder and thereby rotate the shaft 121 through the medium of the rack and pinion, in either direction.

To aid in a more complete understanding of the present invention, the operation of the apparatus in bending and tempering one sheet of glass will be briefly summarized. The sheet of glass 11 to be bent and tempered is heated as it is carried through the heating chamber 15 of the furnace 14. As the heated sheet emerges from the furnace, it is received on the conveyor 27 which moved between the mold parts 24 and 25, whereupon the leading edge of the sheet engages the abutment surfaces 113 of the stop members 112 and is thereby properly positioned above the shaping surface 26 on the lower mold part 25. Upon entering the bending area B, the sheet intercepts a beam L from a lamp source 130 to the photocell 131 mounted by an adjustable bracket 132 on one of the columns 31. Interruption of the light beam L produces a signal which, through a suitable control system, initiates the sequentially occurring phases in one cycle of the bending means 12. The timing of the control system is such that when the leading edge of the sheet engages the abutment surfaces 113 of the locating device 29, either the magnetic clutch 91 will be disengaged and the magnetic brake 98 will be energized to halt rotation of the shaft 95 and thereby the output shaft 100 of the power source 76, or, with the modified form of the invention, the lower mold part will be moved upwardly to remove the sheet from the conveyor 27.

In timed relation, the power source 59 is activated to rotate shaft 54 and the cams 53 fast thereto which, through the followers 52, raise the carriage 45. Immediately before the power source 59 is activated and in advance of the raising of the carriage 45 and mold part 25 thereon, pressure fluid is admitted to the rod end of the cylinder 126 causing the piston 125 to slide away from the path, drawing the rack 127 past the pinion 129 thereby rotating the shaft 121 to move the stop members 112 upwardly into their inoperative positions.

As the heated sheet is moved into the bending area B, the lower mold part 25 is disposed slightly below the horizontal run 71 of the conveyor 27 which supports the sheet in a substantially horizontal plane. As the cams 53 are rotated, the followers 52 traverse the developed periphery of the cams, raising the lower mold part to lift the sheet from the plane defined by the horizontal run 71 and carry it upwardly into pressing engagement with the shaping surface 26 of the upper mold part 24; the movements of the lower mold part being guided by the four bar parallel linkage 64 to insure accurate registration of the upper and lower mold parts. Depending upon which of the illustrated forms of the conveyor 27 is utilized, the lower mold part either deflects the conveyor upwardly or lifts the sheet off of the conveyor.

After the sheet has been pressed between the mold parts and assumes the curvature defined by the shaping surfaces 26 and upon further rotation of the cams 53, the lower mold part moves downwardly away from the upper mold part and toward the path. During this downward travel of the lower mold part or, preferably, during an interruption in this downward travel, the opposite surfaces of the bent sheet are subjected to blasts of relatively cool air from the pipes 104 and 107.

After the sheets are returned to the horizontal run 71 of the conveyor 27, operation of the power source 59 is terminated and the timed sequence of control either reenergizes the clutch 91 and releases the brake 98 whereby the conveyor 27 and the section 87 are driven by the power source 76 at a relatively high rate of speed or the clutch is merely reversed to switch the power source from low to high speed. Further, when the sheet is moved onto the rolls 21 of the section 87, the clutch 91 is reversed once more to reduce the speed of the output shaft 100 and thereby the speed of the conveyor 27 and the section 87. Substantially simultaneously, pressure fluid is exhausted from the rod end of the cylinder 126 and admitted to the head end thereof to effect return movement of the stop members 112 toward the path to move the abutment surfaces 113 ino the plane of the path. With the lower mold part 25 in its lowermost position, the stop members 112 of the locating device 29 in position to be engaged by a succeeding glass sheet and the conveyor 27 operated at the slower speed, the automatically occurring cycle of the bending equipment is brought to completion and in readiness for subsequent operation upon a sheet of glass successively passing the sensing device 28.

It is to be understood that the forms of the invention herewith shown and described are to be as illustrative embodiments only of the same, and that various changes in the shape, size and arrangement of parts, as well as various procedural changes may be resorted to without departing from the spirit of the invention.

I claim:

1. In apparatus for bending each of a plurality of glass sheets moving successively along a predetermined substantially horizontal path, upper and lower mold parts provided with complemental shaping surfaces, the lower mold part being movable vertically toward and away from said upper mold part, an endless belt conveyor disposed in a loop encircling said lower mold part and having a horizontal run extending along said path between said upper and lower mold parts for receiving a sheet to be bent and for positioning it between said mold parts, means disposed at opposite sides of said upper and lower mold parts for supporting the horizontal run of said conveyor, means for driving said conveyor intermittently endwise around said loop, and means for raising said lower mold part toward said upper mold part when the sheet is supported therebetween to effect the bending of the sheet between said mold parts.

2. In apparatus as defined in claim 1, in which the endless conveyor comprises a continuous belt of a width substantially equal to that of the glass sheet to be bent and serving to support the sheet during the bending thereof between said mold parts.

3. In apparatus as defined in claim 1, in which the endless conveyor comprises a plurality of relatively narrow endless belts arranged in spaced parallel relation for receiving the glass sheet to be bent, and in which the lower mold part is formed with pairs of aligned slots for receiving the horizontal runs of said belts to deposit the sheet upon the shaping surface of the lower mold part upon raising of said lower mold part to press the sheet against the upper mold part.

4. In apparatus for bending each of a plurality of glass sheets moving successively along a predetermined substantially horizontal path, upper and lower mold parts provided with complemental shaping surfaces, the lower mold part being movable vertically toward and away from said upper mold part, an endless conveyor having a horizontal run extending along said path between said upper and lower mold parts for receiving the sheet to be bent and for positioning it between said mold parts, means disposed at opposite sides of said upper and lower mold parts for supporting the horizontal run of said conveyor, driving means for said conveyor, and resilient means for normally maintaining said conveyor taut, said last-named means being operable to allow the horizontal run of the conveyor to be deflected upwardly by said lower mold part upon upward movement thereof to bring the glass sheet into pressing engagement with the shaping surface of the upper mold part.

5. In apparatus as defined in claim 4, in which the means for maintaining the conveyor taut comprises a rotatable idler pulley about which the endless conveyor is trained, means for pivotally mounting said idler pulley, and means resiliently urging said idler pulley against said conveyor.

6. In apparatus as defined in claim 4, in which said endless conveyor comprises a plurality of relatively narrow endless belts arranged in spaced parallel relation to one another, and in which the lower mold part is provided with pairs of aligned slots for receiving the horizontal runs of the belts therein upon upward movement of the lower mold part to deposit the sheet to be bent upon said lower mold part.

7. In apparatus for bending each of a plurality of glass sheets moving successively along a predetermined substantially horizontal path, upper and lower mold parts provided with complemental shaping surfaces, the lower mold part being movable vertically toward and away from said upper mold part, an endless conveyor having a horizontal run extending along said path between said upper and lower mold parts for receiving the sheet to be bent and for positioning it between said mold parts, said endless conveyor being disposed in a loop encircling said lower mold part, guide pulleys at opposite sides of said lower mold part for supporting the horizontal run of said conveyor, a drive pulley disposed within said loop in driving engagement with said conveyor, means for driving said drive pulley to advance said conveyor endwise around said loop, an idler pulley also disposed within said loop and engaging said conveyor, and means resiliently urging said idler pulley against said conveyor to maintain the latter taut.

8. In apparatus as defined in claim 7, in which said endless conveyor comprises a plurality of relatively narrow endless belts arranged in spaced parallel relation to one another and in which the lower mold part is provided with pairs of aligned slots for receiving the horizontal runs of the belts therein upon upward movement of the lower mold part to deposit the sheet to be bent upon said lower mold part, and in which an idler pulley is provided for each of said endless belts to maintain the same taut.

9. A method of bending and tempering glass sheets, comprising supporting a glass sheet in a substantially horizontal plane for movement along a predetermined path through a heating area, a bending area and a chilling area, heating the sheet to the softening point of the glass during its passage through said heating area, advancing said heated sheet into said bending area, pressing the heated sheet in said bending area between complemental shaping surfaces to bend the sheet to the desired curvature, directing streams of cooling fluid against the upper and lower surfaces of the bent sheet while the latter is supported on one of said complemental shaping surfaces until the sheet is set in the desired curvature, advancing said sheet out of said bending area and into said chilling area, and chilling said sheet to temper the same in said chilling area.

10. A method of bending and tempering glass sheets, comprising supporting a glass sheet in a substantially horizontal plane for movement along a predetermined path through a heating area, a bending area and a chilling area, heating the sheet to the softening point of the glass in said heating area, advancing said heated sheet out of said heating area into said bending area and between complemental shaping surfaces formed on upper and lower mold parts disposed above and below said path, moving the lower mold part upwardly relative to said path thereby to lift said sheet from said path and carry the sheet into pressing engagement with said upper mold part to bend the sheet to the desired curvature between said complemental shaping surfaces, separating said mold parts with the bent sheet resting on the shaping surfaces of said lower mold part, directing streams of cooling fluid against the upper and lower surfaces of the bent sheet until the sheet is set in the desired curvature, advancing the sheet out of said bending area into said chilling area, and chilling the sheet in said chilling area.

11. A method of bending and tempering glass sheets, comprising supporting a glass sheet in a substantially horizontal plane for movement along a predetermined path through a heating area, a bending area and a chilling area, heating the sheet to the softening point of the glass in said heating area, advancing said heated sheet out of said heating area into said bending area and between complemental shaping surfaces formed on upper and lower mold parts disposed above and below said path, moving the lower mold part upwardly relative to said path thereby to lift said sheet from said path and carry the sheet into pressing engagement with said upper mold part to bend the sheet to the desired curvature between said complemental shaping surfaces, moving said lower mold part downwardly toward said path, directing streams of cooling fluid against the upper and lower surfaces of the bent sheet until the sheet is set to the desired curvature during said lowering movement of said mold part and while said sheet is resting on the shaping surface of said lower mold part and before said sheet is returned to said predetermined path, advancing the sheet out of said bending area into said chilling area, and chilling the sheet in said chilling area.

12. A method of bending and tempering glass sheets, comprising supporting a glass sheet in a substantially horizontal plane for movement along a predetermined path through a heating area, a bending area and a chilling area, heating said sheet to the softening point of the glass during its passage through said heating area, advancing said heated sheet out of said heating area and into said bending area at a preselected speed, positioning the sheet between complemental shaping surfaces formed on upper and lower mold parts disposed above and below said path in said bending area, moving said lower mold part upwardly to lift the sheet from said predetermined path and carrying the sheet into pressing engagement with said upper mold part to bend the sheet to the desired curvature between said complemental shaping surfaces, lowering said lower mold part toward said predetermined path, directing streams of cooling fluid against upper and lower surfaces of the glass sheets while the latter are resting on the shaping surface of said lower mold part until the sheet is set in the desired curvature, returning the sheet to the predetermined path, advancing the sheet out of said bending area into said chilling area at a second speed relatively greater than said preselected speed, reducing the rate of movement of the sheet to a speed less than said second speed as the sheet is moved into said chilling area, and cooling the sheet in said chilling area.

13. An apparatus for bending each of a plurality of glass sheets moving successively along a predetermined substantially horizontal path, upper and lower mold parts having complemental shaping surfaces formed thereon, said lower mold part being movable vertically toward and away from said upper mold part, a conveyor for moving the sheets along said horizontal path between said upper and lower mold parts, means for intermittently driving said conveyor to move a sheet to be bent between said complemental shaping surfaces, means for raising said lower mold part towards said upper mold part when said sheet is poistioned therebetween to effect the bending of the sheet between said mold parts and thereafter lowering said lower mold part to return said sheet to said conveyor, and means for directing cooling fluid against opposite surfaces of the sheet after the latter is bent but while it is still resting on said lower mold part until the sheet is set in the desired curvature.

References Cited by the Examiner

UNITED STATES PATENTS

| | | | |
|---|---|---|---|
| 1,846,566 | 2/1932 | Mulholland | 65—119 |
| 2,223,124 | 11/1940 | Owen | 65—104 X |
| 2,348,887 | 5/1944 | Drake | 65—106 |
| 2,570,309 | 10/1951 | Black | 65—285 X |
| 3,123,459 | 3/1964 | Hens | 65—106 |

DONALL H. SYLVESTER, *Primary Examiner.*

MORRIS O. WOLK, *Examiner.*

A. D. KELLOGG, *Assistant Examiner.*